United States Patent [19]

Wolber

[11] 3,996,552
[45] Dec. 7, 1976

[54] DEVICE FOR PROVIDING A HOLOGRAM OF AN INSONIFIED OBJECT

[75] Inventor: William G. Wolber, Southfield, Mich.

[73] Assignee: The Bendix Corporation, North Hollywood, Calif.

[22] Filed: Apr. 28, 1975

[21] Appl. No.: 572,259

[52] U.S. Cl. .............................. 340/5 H; 73/67.5 H; 313/369
[51] Int. Cl.² ..................... G01S 9/66; H01J 31/495
[58] Field of Search ........ 340/5 MP, 5 H; 313/369; 73/67.5 H

[56] References Cited
UNITED STATES PATENTS 3,879,700  4/1975  Barkhoudarian et al. ...... 340/5 MP

*Primary Examiner*—Richard A. Farley
*Attorney, Agent, or Firm*—Robert C. Smith; William F. Thornton

[57] ABSTRACT

A device for providing a hologram of an object which may be converted to an optical image in real time. The device is part of an acoustical holographic system which uses a source of coherent acoustic radiation to irradiate the object which reflects the acoustic radiation on to a piezoelectric transducer to provide a rapidly varying sinusoidal electronic charge pattern corresponding to the reflected acoustic radiation. Electrons are released from a photocathode, illuminated by a radiation source, in a spatial distribution of electron energies corresponding in space and time to the electronic charge pattern. A first grid positioned adjacent the photocathode is maintained at a potential to provide a modulated electron current which varies in space and time linearly in accordance with the acoustic input. The electron current is modulated by a second grid energized by a coherent reference voltage of fixed phase to function as a reference signal as used in holography. A microchannel plate electron multiplier amplifies the modulated electron current, and the amplified current is imaged on a high potential phosphor screen and provides an optical image of the hologram of the insonified object. The hologram may be converted into electric signals (video) by a conventional TV camera. For displaying an image of the object itself in real time, the video signals may be processed in an electro-optical Fourier transform converter tube, or may be processed by a fast Fourier transform computer and displayed on a cathode ray tube.

22 Claims, 2 Drawing Figures

DEVICE FOR PROVIDING A HOLOGRAM OF AN INSONIFIED OBJECT

The invention relates to acoustical imaging and more particularly to acoustical holography.

PRIOR ART

A device for providing a hologram of an object using coherent acoustic waves for irradiating the object is shown and described in U.S. Pat. No. 3,717,843. An array of transducers receives reflected radiation from the object and each transducer produces an electrical signal having a phase and amplitude corresponding to the phase and amplitude of the acoustic radiation reflected from the object and received at a particular position on the array. Processing apparatus including gating means responsive to coherent electric reference signals and to the signals from the transducer array provide electrical outputs each having an amplitude proportional to the product of the amplitude of the signal from a transducer and the cosine of the phase difference between the reference signal and the signal from the transducer. The outputs are integrated and produce a hologram of the object when supplied to a display device in the proper sequence. The hologram is then converted into a reconstruction of the image of the object in real time by means known in the art.

The device of the above patent is complex because the array requires a transducer and associated electronics for each element of the acoustic radiation reflected from the object. For the large arrays needed for high resolution systems, the cost of the electronics can become prohibitive, since being analog, they cannot be produced at low cost using low cost semiconductor production methods such as large scale integrated circuitry.

A device for converting an acoustic pattern of an object in real time to a visual image of the object without scanning techniques is shown and described in U.S. Pat. No. 3,879,700. The acoustic pattern is imaged by an acoustic lens on a piezoelectric transducer and is converted to an electronic charge pattern. A source of electrons, such as a photocathode is irradiated by a radiation source and electrons are released from the photocathode having a spatial distribution of electron energies corresponding to the acoustic pattern. A grid adjacent the photocathode is maintained at a potential so that modulation of the electron current from the photocathode by the electronic charge pattern occurs in the non-linear region of the electron energy distribution curve to provide an average electron current which varies in accordance with the acoustic input amplitude. The electrons are multiplied by a microchannel plate electron multiplier and are converted into photon energy by a phosphor screen to provide a visual image of the object. The acoustic lens for imaging the acoustic pattern on the piezoelectric transducer is only practical for relatively high frequency (< 1 MHz) excitation because of limits to lens size. Such high frequency acoustic energy is readily dissipated by sea water and this limits the range of the sonar equipment.

SUMMARY OF THE INVENTION

The present invention eliminates the acoustic lens and the large array of electronics required in the devices described above. A device constructed according to the present invention uses radiation of relatively low frequency (100 KHz - 1 MHz) for medium-to-long range in sea water and is simple in construction and operation.

The present device is incorporated in a system using a source of coherent acoustic radiation to irradiate the object which reflects the acoustic radiation on to a piezoelectric transducer to provide an electronic charge pattern corresponding to the reflected acoustic radiation received by the transducer both in space and time. A source of electrons, such as a photocathode illuminated by a radiation source, is closely associated with the piezoelectric transducer. Electrons are released from the photocathode in a spatial distribution of electron energies corresponding to the electronic charge pattern. A first grid positioned adjacent the photocathode is maintained at a potential to provide an electron current which varies linearly in accordance with the acoustic input instantaneous amplitude. The electron current is modulated by a second grid energized by a reference voltage coherent with the acoustic source and of fixed phase to function as a reference signal as used in holography. Primarily the function of the second grid is to provide a signal component in the output current for each transducer image element having an average or quasi-steady-state value which is a measure of the difference in phase of the signal component and reference voltage.

The modulated spatially distributed electron current, which corresponds to the hologram of the insonified object, is linearly amplified by a microchannel plate electron multiplier and the spatially distributed amplified current is imaged on a high potential phosphor screen and provides an optical image of the hologram of the insonified object. The hologram may be converted into electric signals (video) by a conventional TV camera. An image of the object can be reconstructed from such signals in real time by methods such as are described in U.S. Pat. No. 3,717,843.

THE DRAWING

FIG. 1 is a schematic diagram of a device constructed according to the invention for providing a hologram of an insonified object, and FIG. 2 shows a holographic sonar system including the device of FIG. 1.

DETAILED DESCRIPTION

Figure 1:
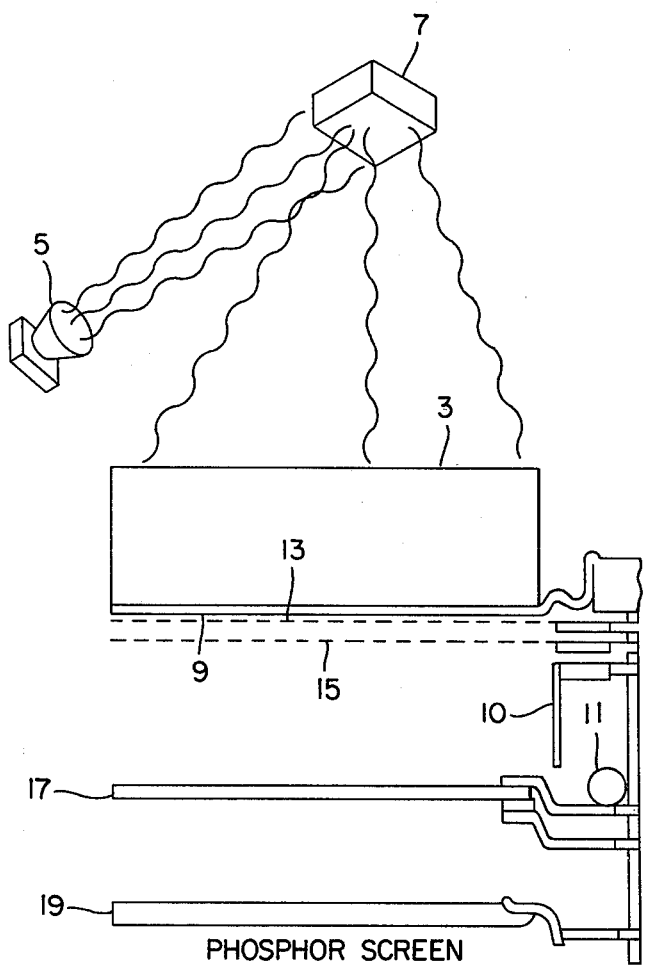

Referring to the drawing, a device constructed according to the invention is shown in FIG. 1 as comprising an evacuated tube having a piezoelectric transducer 3 or array of transducers, such as quartz, crystal or barium titanate ceramic. A source of coherent acoustic radiation 5 irradiates an object 7 which reflects the acoustic radiation on to the piezoelectric transducer to provide an electronic charge pattern corresponding to the reflected acoustic radiation. Transducer 3 has a photocathode 9 associated therewith, preferably on one surface, and the photocathode may be made of any suitable material uniformly irradiated through a mask 10 by a radiation source 11, such as ultraviolet, infrared, electromagnetic or radioactive. The photocathode should have a relatively large current output over a wide range of linear electron energy distribution. The photocathode preferably is made of platinum irradiated by a monochromatic ultraviolet source, as for example, a mercury source with a line near 2000 nanometers wavelength.

The irradiated photocathode is a source of electrons which are released from the photocathode in a spatial and temporal distribution of electron energies corresponding to the generally sinusoidal electronic charge pattern.

A first grid 13 in the form of a fine mesh is positioned adjacent to photocathode 9 and is maintained at a potential to bias the electron current in a linear region of the electron energy distribution curve. Grid 13 passes high energy electrons and repels low energy electrons and the electron current passing through the grid is modulated by the electronic charge pattern and each spatial element of the electron current varies linearly in amplitude in accordance with the instantaneous amplitude of the reflected acoustic wave. Each spatial element of the electron current also is phase displaced as a function of the distance the acoustic wave reflected from the object travels from the object to the corresponding element on the piezoelectric transducer. The spatial distribution of the electron current elements is determined by the angle of reflection of the corresponding acoustic wave from the object.

A second grid 15 in the form of a fine mesh, electrically and capacitively isolated from the remainder of the device, is positioned adjacent to grid 13 and is energized by a coherent reference voltage having the same frequency as the acoustic source and of fixed phase relative thereto and functions as the reference signal used in holography. The reference voltage modulates the spatially distributed electron current so that each spatial element of the electron current is phase detected by the reference voltage as a function of the distance the acoustic wave reflected from the object travels from the object to the corresponding element on the piezoelectric transducer. A component of the resulting image current represents the corresponding hologram point. This component varies slowly in time as a function of motion or other change of the object.

Thus a component of the modulated spatially distributed electron current corresponds to the hologram of the insonified object. The average value of all other components of the modulated electron current is a constant value.

The modulated electron current is linearly amplified by a microchannel plate electron multiplier 17 and the spatially distributed current from the microchannel plate is imaged on a high potential phosphor screen 19 where it is converted to photon energy and provides an optical image of the hologram of the insonified object. The hologram may be converted into electric signals, for example, with a conventional TV camera for reconstructing and displaying an image of the object in the usual manner.

In one embodiment the voltages used on the various elements of the tube are as follows:

| | |
|---|---|
| Piezoelectric transducer and Photocathode | Ground Potential |
| Biasing Grid | −0.45 volts D.C. |
| Modulating Grid | 1000 volts A.C. peak to peak |
| | 500 volts D.C. |
| Microchannel Plate Electron Multiplier- | |
| front face | 800 volts D.C. |
| rear face | 1800 volts D.C. |
| Phosphor Screen | 6800 volts D.C. |

Figure 2:
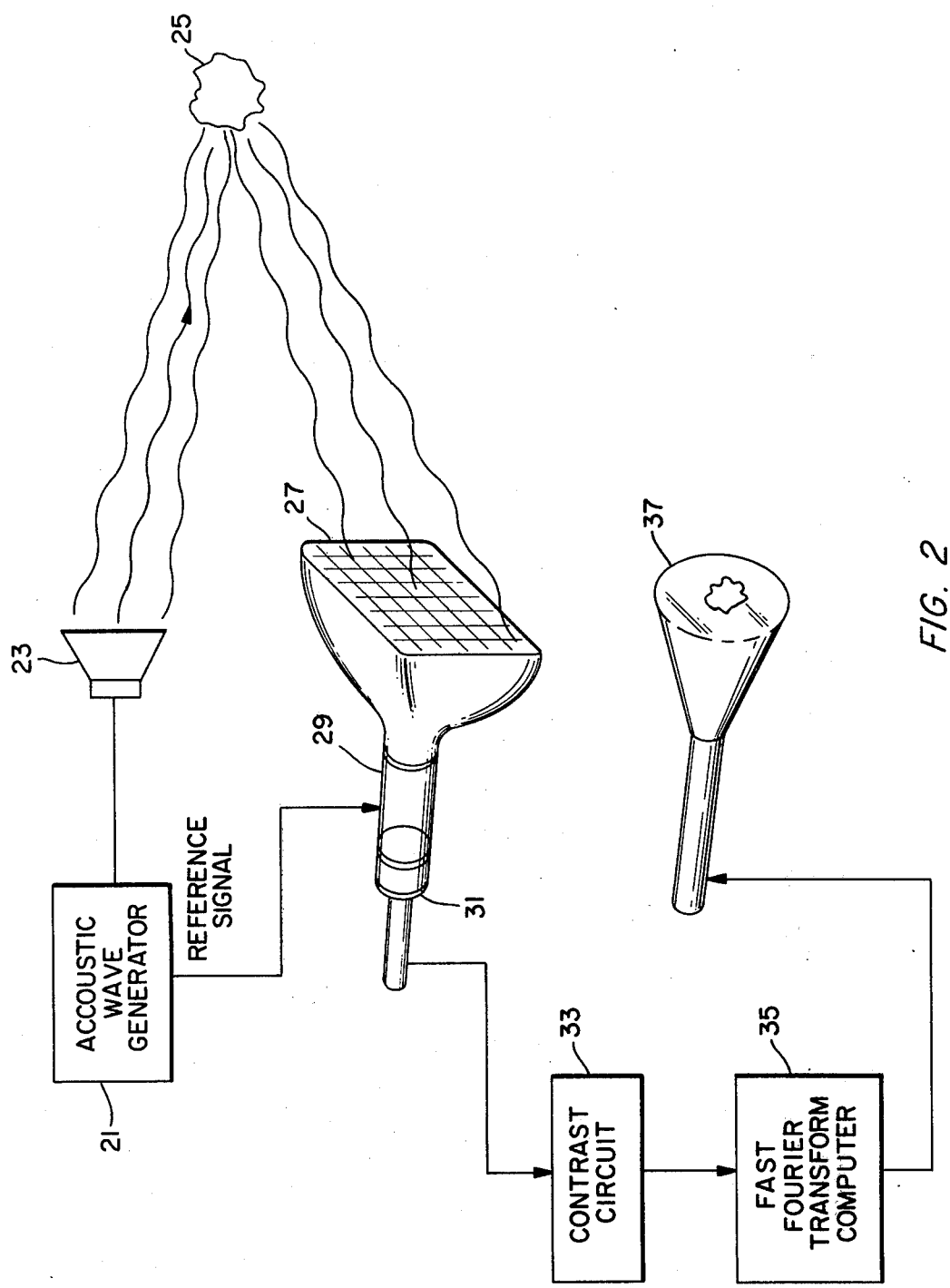

FIG. 2 shows a holographic sonar system including the device shown in FIG. 1 for providing a hologram according to the invention. An acoustic wave generator 21 provides acoustic coherent sinusoidal excitation of predetermined frequency to an acoustic projector 23 which transmits the acoustic waves through a medium, such as sea water, to an object or target 25.

The acoustic waves are reflected from image points on the target to an array of transducers 27 which convert the acoustic waves into electrical signals at the frequency of the acoustic waves. As described above, the electrical signals differ in amplitude as a function of the intensities of the reflected acoustic waves and differ in phase as a function of the distances the reflected acoustic waves travel from the object to the corresponding transducers. The distribution of the electrical signals is a function of the angles of reflection of the acoustic waves.

The signals are processed by device 29 in the manner described above to provide an optical image of the hologram of the target on a field of fixed brightness. A video camera 31 scans the optical image of the hologram and provides a video output corresponding to the hologram. A contrast circuit 33 connected to video camera 31 may be provided to enhance contrast by attenuating the fixed components of the video output corresponding to the fixed brightness field. The attenuated video output corresponding to the hologram of the target is applied to a fast Fourier transform computer 35 which performs a matrix inversion to provide an electrical video image of target 25 which is converted into an optical image of the target by a cathode ray tube 37.

A device constructed according to the invention uses radiation of relatively low (typically 100 KHz – 1 MHz) frequency for long range in sea water and is simple in construction and operation. It provides a hologram of an insonified object which may be converted into a visual image of the object in real time.

A device constructed according to the invention can be used in underwater viewing systems, sonar, in medical diagnostics, non-destructive testing and other applications.

What is claimed is:

1. A device for converting acoustic radiation from a source which is reflected from an object into a hologram, comprising a piezoelectric transducer for receiving the reflected acoustic radiation and providing an electronic charge pattern corresponding thereto, a source of electrons associated with the piezoelectric transducer for providing a spatial electron current modulated by the electronic charge pattern, means for biasing the electron current in a linear region of the cathode current-grid voltage curve, and means for modulating the biased electron current by a reference voltage of fixed phase relative to the acoustic source to provide a spatial electron current having a component corresponding to the hologram of the object.

2. A device for providing a hologram of an object as described in claim 1, in which the reference voltage is the same frequency as the acoustic source.

3. A device for providing a hologram of an object as described in claim 1 in which the means for biasing the electron current is a grid in the form of a fine mesh.

4. A device for providing a hologram of an object as described in claim 1 in which the means for modulating the biased electron current is a grid in the form of a fine mesh.

5. A device for providing a hologram of an object as described in claim 1 in which the source of electrons is a photocathode modulated by a radiation source.

6. A device for providing a hologram of an object as described in claim 5 in which the photocathode is made of platinum and is irradiated by a quasi-monochromatic ultraviolet light source.

7. A device for providing a hologram of an object as described in claim 6 in which the quasi-monochromatic ultraviolet light source is a mercury source with a line near 2000 nanometers wavelength.

8. A device for providing a hologram of an object as described in claim 6 in which the biasing means comprises a grid in the form of a fine mesh which is energized by a voltage source of approximately −0.45 volts relative to the potential of the piezoelectric transducer.

9. A device for providing a hologram of an object as described in claim 8 in which the modulating means comprises a grid in the form of a fine mesh which is energized by a voltage source of approximately 1000 volts peak to peak A.C. relative to the biasing grid.

10. A device for providing a hologram of an object as described in claim 1 including a microchannel plate electron multiplier for amplifying the spatial electron current corresponding to the hologram of the object.

11. A device for providing a hologram of an object as described in claim 10 including means for converting the amplified spatial electron current corresponding to the hologram to an optical image of the hologram.

12. A device for providing a hologram of an object as described in claim 11 in which the means for converting the amplified spatial current to an optical image is a phosphor screen.

13. A device for providing a hologram of an object comprising a source of coherent acoustic radiation for irradiating the object, a piezoelectric transducer for receiving acoustic radiation reflected from the object and providing an electronic charge pattern corresponding thereto, a source of electrons associated with the piezoelectric transducer for providing a spatial electron current modulated by the electronic charge pattern, means for biasing the electron current in a linear region of the cathode current-grid voltage curve, and means for modulating the biased electron current by a reference voltage of fixed phase relative to the acoustic source to provide a spatial electron current with a component corresponding to the hologram of the object.

14. A device for providing a hologram of an object as described in claim 13 including a microchannel plate electron multiplier for amplifying the spatial electron current corresponding to the hologram of the object.

15. A device for providing a hologram of an object as described in claim 14 including means for converting the amplified spatial electron current corresponding to the hologram to an optical image of the hologram.

16. A device for providing a hologram of an object as described in claim 15 in which the means for converting the amplified spatial current to an optical image is a phosphor screen.

17. A holographic sonar system comprising a device for providing a hologram of an object as described in claim 15, and means for transducing the optical image of the hologram into a video output, means for providing an electrical image of the object from the video signal and means for converting the electrical image into an optical image of the object.

18. A holographic sonar system as described in claim 17 in which the means for transducing the optical image of a hologram into a video output includes a video camera.

19. A holographic sonar system as described in claim 17 in which the means for providing an electrical image of the object from the video signal includes a fast Fourier transform computer.

20. A holograhic sonar system as described in claim 17 in which the means for converting the electrical image into an optical image of the object includes a cathode ray tube.

21. A holographic sonar system comprising a device for providing a hologram of an object as described in claim 15, and a video camera for transducing the optical image of the hologram into a video output, a fast Fourier transform computer for providing an electrical image of the object from the video signal, and a cathode ray tube for converting the electrical image into an optical image of the object.

22. A holographic sonar system comprising a device for providing a hologram of an object as described in claim 21 which includes a contrast circuit connected to the video camera for attenuating fixed components of the video output corresponding to a fixed brightness field to enhance contrast.

* * * * *